(12) United States Patent
Biskeborn

(10) Patent No.: US 10,783,905 B2
(45) Date of Patent: *Sep. 22, 2020

(54) STRESS-FREE TAPE HEAD MODULE

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,765

(22) Filed: Jun. 20, 2019

(65) Prior Publication Data

US 2019/0304493 A1    Oct. 3, 2019

Related U.S. Application Data

(63) Continuation of application No. 15/936,138, filed on Mar. 26, 2018, now Pat. No. 10,395,675.

(51) Int. Cl.
*G11B 5/31* (2006.01)

(52) U.S. Cl.
CPC .................. *G11B 5/3173* (2013.01)

(58) Field of Classification Search
CPC ................ G11B 5/31; G11B 5/3173
USPC .......................................... 360/121
See application file for complete search history.

(56) References Cited

U.S. PATENT DOCUMENTS

| | | |
|---|---|---|
| 4,819,113 A | 4/1989 | Kubota et al. |
| 5,329,795 A | 7/1994 | Sartorio et al. |
| 5,485,335 A | 1/1996 | West |
| 5,636,092 A | 6/1997 | Nasu et al. |
| 5,754,370 A | 5/1998 | Tsuchiya et al. |
| 8,824,083 B1 | 9/2014 | Kientz et al. |
| 9,661,411 B1 | 5/2017 | Han et al. |
| 10,395,675 B1 | 8/2019 | Biskeborn |
| 10,607,637 B2 | 3/2020 | Biskeborn |
| 2001/0017749 A1 | 8/2001 | Stefansky |
| 2003/0116874 A1 | 6/2003 | Haynes |
| 2003/0202291 A1 | 10/2003 | Pan et al. |
| 2004/0027725 A1* | 2/2004 | Pan ................... G11B 5/484 360/245.3 |
| 2006/0023358 A1 | 2/2006 | Huang |
| 2010/0073816 A1 | 3/2010 | Komori et al. |
| 2015/0194171 A1 | 7/2015 | Chua |

(Continued)

FOREIGN PATENT DOCUMENTS

WO    2008089665 A1    7/2008

OTHER PUBLICATIONS

Notice of Allowance from U.S. Appl. No. 16/446,490, dated Sep. 26, 2019.

(Continued)

*Primary Examiner* — Allen T Cao

(74) *Attorney, Agent, or Firm* — Zilka-Kotab, P.C.

(57) ABSTRACT

According to one embodiment, a method includes attaching a die to a beam, wherein the die comprises an array of transducers positioned in a transducer region of the die, a first region extending from the transducer region to a first end of the die and a second region extending from the transducer region to a second end of the die. The first region of the die is attached to the beam. The transducer region and the second region are not attached to the beam.

19 Claims, 11 Drawing Sheets

(56) References Cited

U.S. PATENT DOCUMENTS

| | | | |
|---|---|---|---|
| 2016/0211439 A1* | 7/2016 | Najafi | .................. H01L 41/0825 |
| 2019/0304492 A1 | 10/2019 | Biskeborn | |
| 2020/0066300 A1 | 2/2020 | Biskeborn | |

OTHER PUBLICATIONS

Biskeborn, R. G., U.S. Appl. No. 16/446,490, filed Jun. 19, 2019.
List of IBM Patents or Patent Applications Treated As Related.
Nortronics Co., "Magnetic Tape Head Specifications," Dec. 2013, pp. 1-6 retrieved from http://lcweb2.loc.gov/master/mbrs/recording_preservation/manuals/Nortraonics%20Magnetic%20Tape%20Heads%20Specifications.pdf.
Biskeborn, R. G., U.S. Appl. No. 15/936,138, filed Mar. 26, 2018.
Restriction Requirement from U.S. Appl. No. 15/936,138, dated Jan. 14, 2019.
Ex Parte Quayle from U.S. Appl. No. 15/936,138, dated Apr. 9, 2019.
Notice of Allowance from U.S. Appl. No. 15/936,138, dated Apr. 30, 2019.
Supplemental Notice of Allowance from U.S. Appl. No. 16/446,490, dated Oct. 30, 2019.
Notice of Allowance from U.S. Appl. No. 16/446,490, dated Nov. 22, 2019.
Biskeborn, R. G., U.S. Appl. No. 16/670,958, filed Oct. 31, 2019.
Supplemental Notice of Allowance from U.S. Appl. No. 16/446,490, dated Dec. 11, 2019.
Non-Final Office Action from U.S. Appl. No. 16/670,958, dated Dec. 11, 2019.
Supplemental Notice of Allowance from U.S. Appl. No. 16/446,490, dated Jan. 15, 2020.
Notice of Allowance from U.S. Appl. No. 16/670,958, dated May 4, 2020.
Supplemental Notice of Allowance from U.S. Appl. No. 16/670,958, dated May 28, 2020.
Supplemental Notice of Allowance from U.S. Appl. No. 16/670,958, dated Aug. 5, 2020.

* cited by examiner

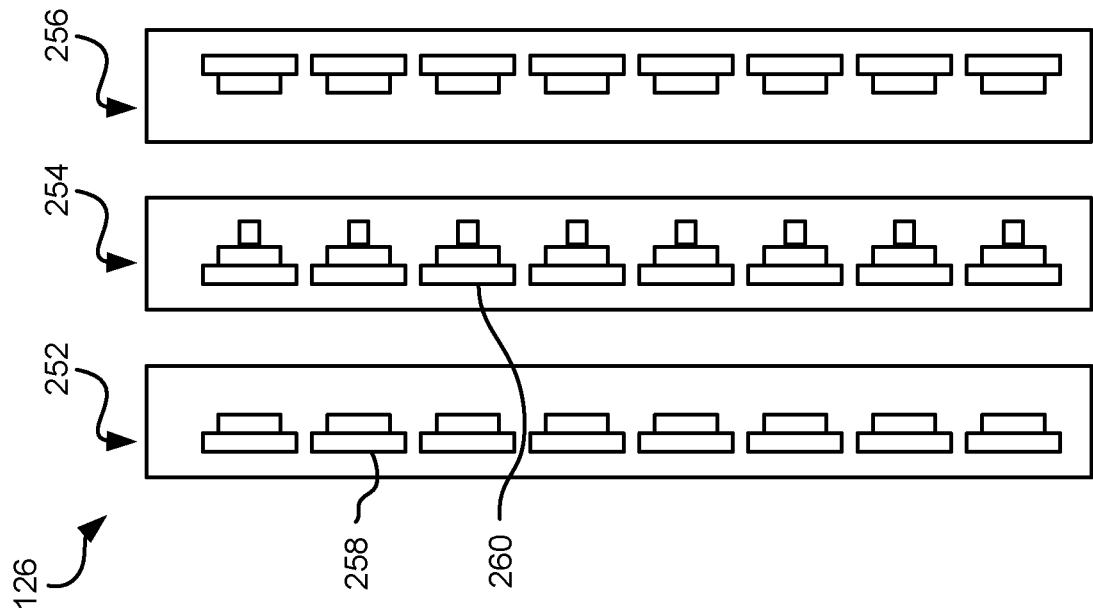
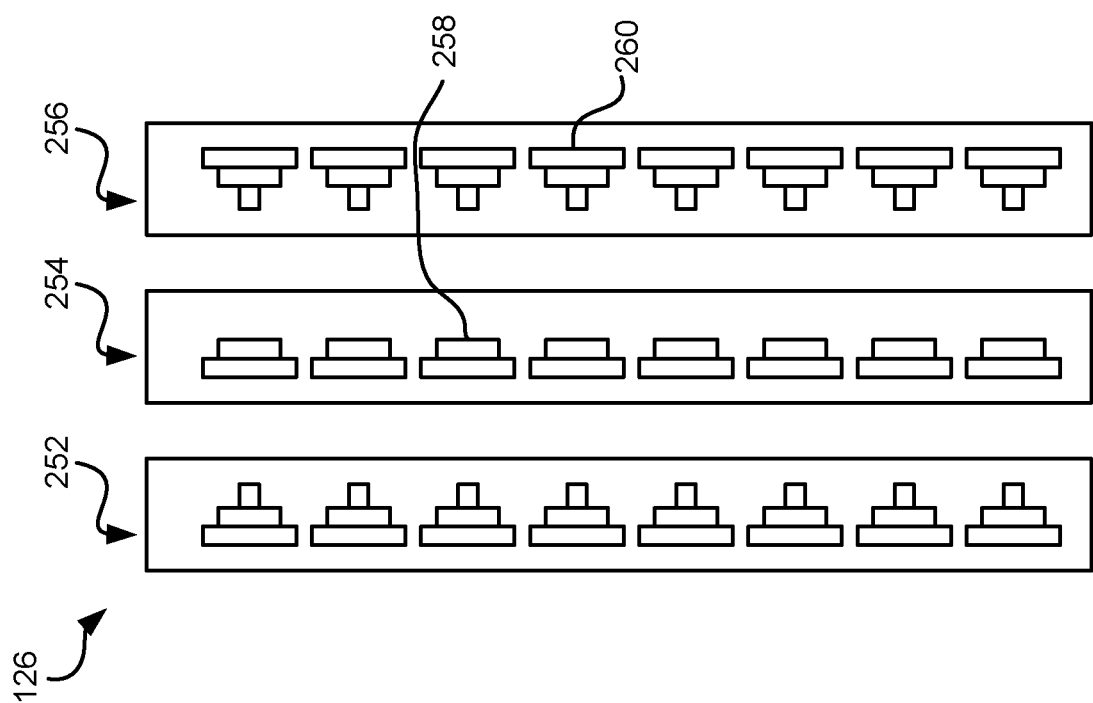

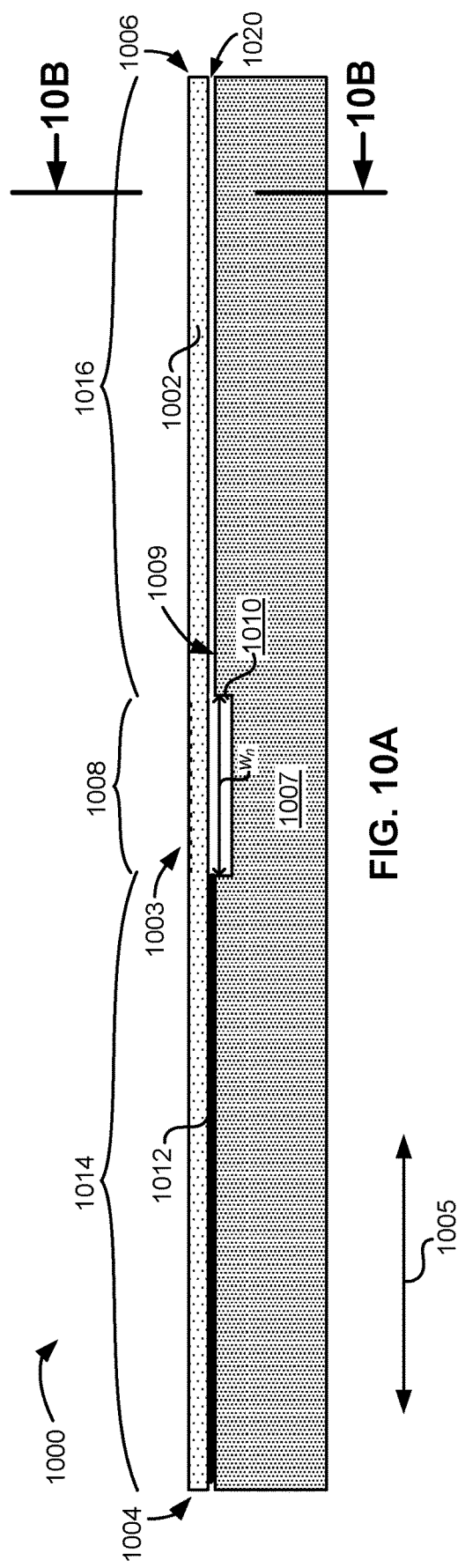
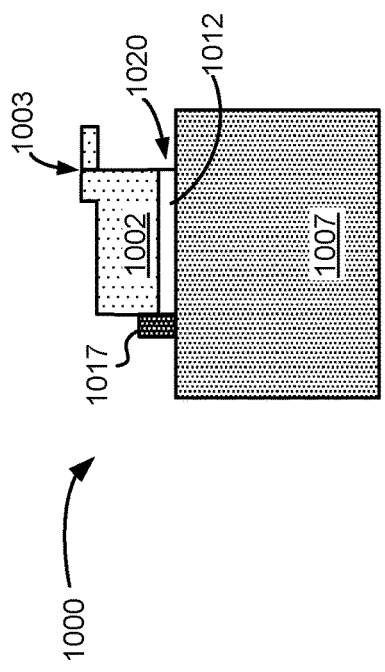
FIG. 10A
FIG. 10B

STRESS-FREE TAPE HEAD MODULE

BACKGROUND

The present invention relates to measurement of features of magnetic tape head modules, and more particularly, this invention relates to an essentially stress-free magnetic tape head module.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

According to one embodiment, a method includes attaching a die to a beam, wherein the die comprises an array of transducers positioned in a transducer region of the die, a first region extending from the transducer region to a first end of the die and a second region extending from the transducer region to a second end of the die. The first region of the die is attached to the beam. The transducer region and the second region are not attached to the beam.

According to another embodiment, a method for removing a sacrificial adhesive from an apparatus includes applying a solvent to an apparatus having a die fixedly attached to a beam, wherein a solvent-resistant adhesive attaches a first portion of the die to the beam and a sacrificial adhesive attaches a second portion of the die to the beam, wherein the solvent dissolves the sacrificial adhesive thereby removing the sacrificial adhesive from the apparatus.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 10A is a side view of a schematic diagram of a module, according to one embodiment.

FIG. 10B is a cross-sectional view of FIG. 10A taken along line 10B-10B.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of a stress-free magnetic tape head module, as well as operation and/or component parts thereof.

In one general embodiment, an apparatus includes a die comprising an array of transducers in a transducer region of the die, a first region extending from the transducer region to a first end of the die and a second region extending from the transducer region to a second end of the die. The apparatus also includes a beam. The first region of the die is fixedly attached to the beam. The transducer region and the second region are not fixedly attached to the beam.

In another general embodiment, an apparatus includes a die comprising an array of transducers in a transducer region of the die, a first region extending from the transducer region to a first end of the die and a second region extending from the transducer region to a second end of the die. The apparatus also includes a beam. The transducer region of the die is fixedly attached to the beam.

Figure 1A:
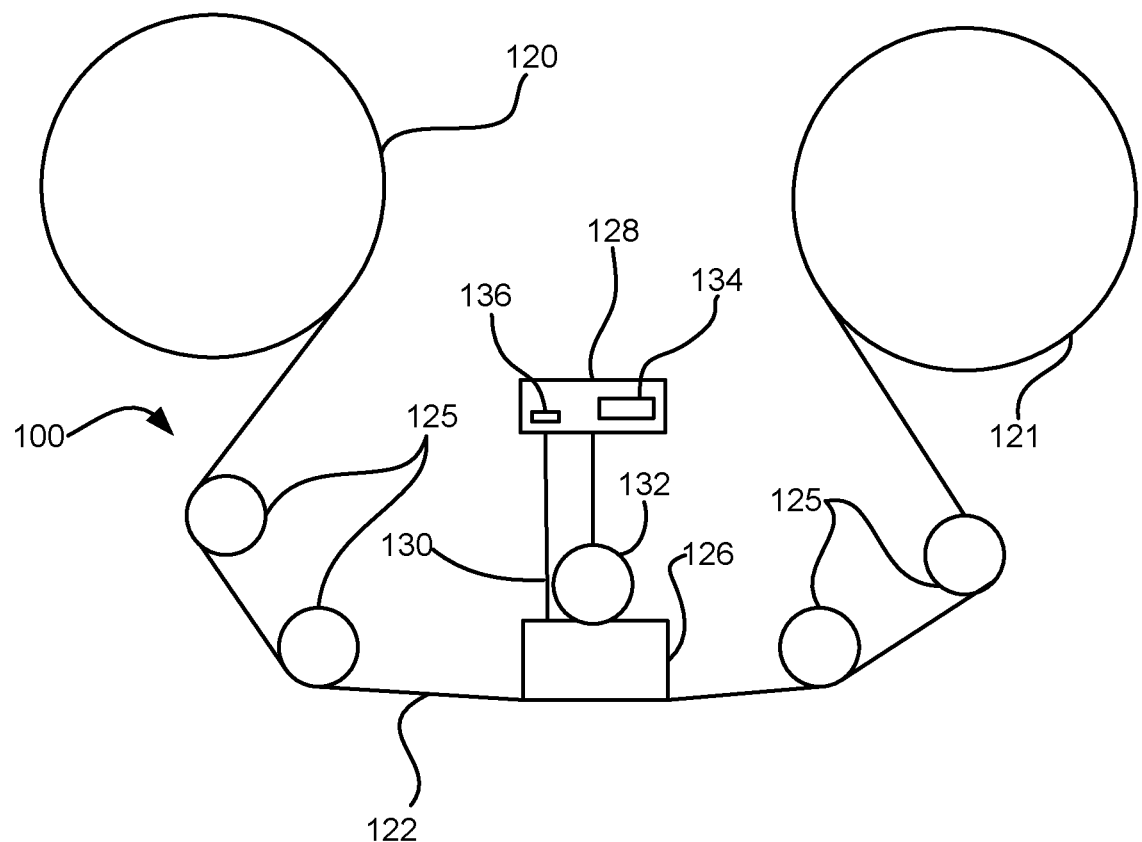
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
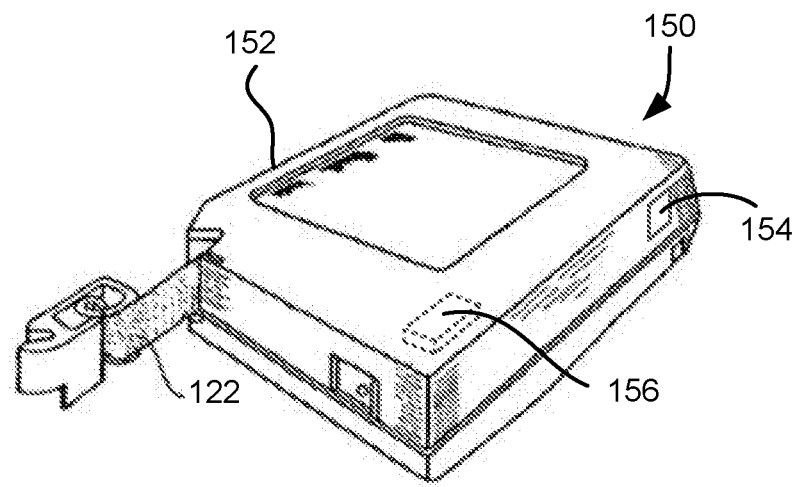
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
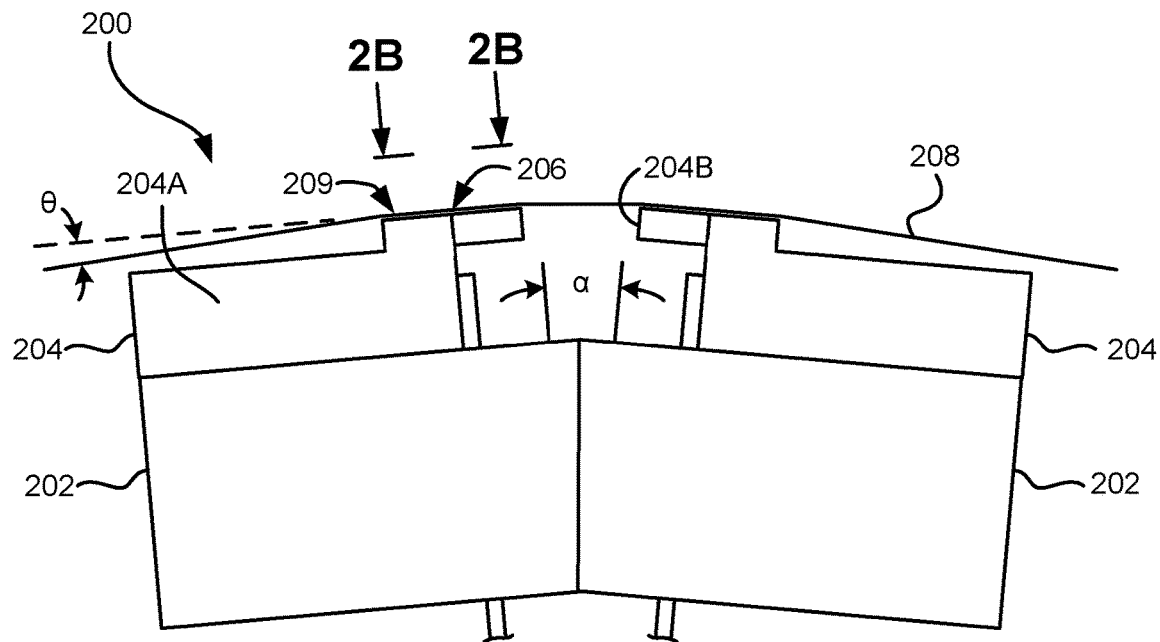
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
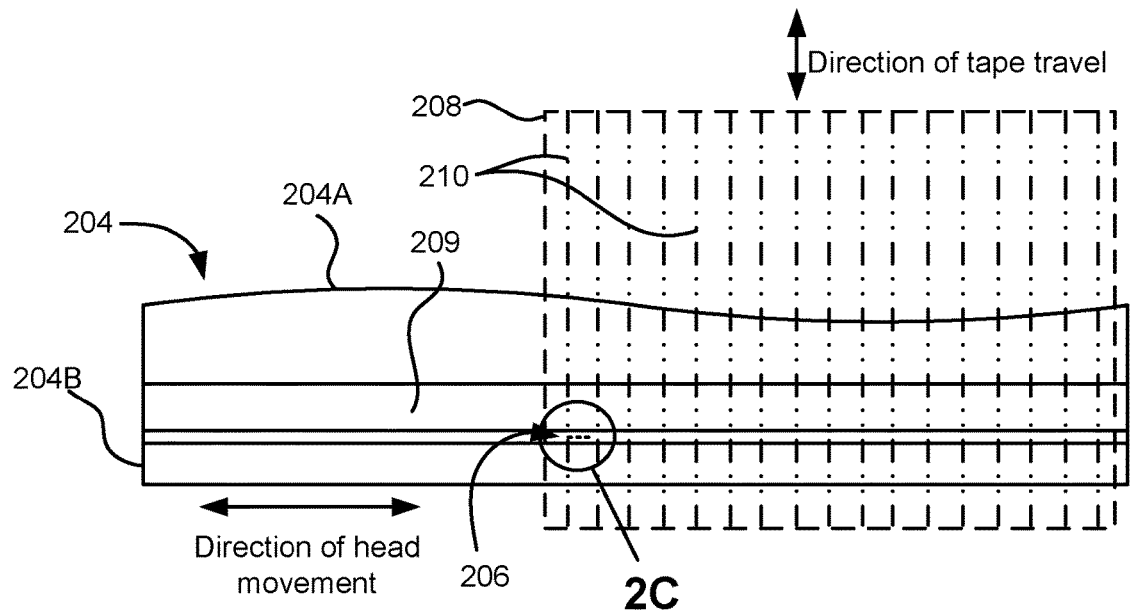
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
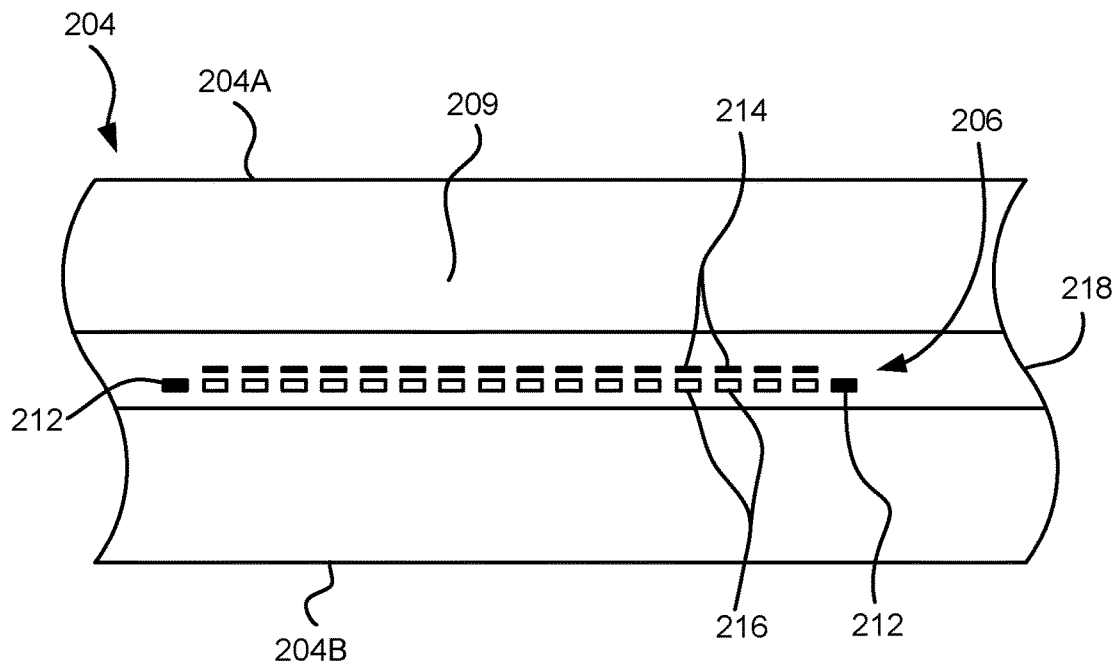
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary.

Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
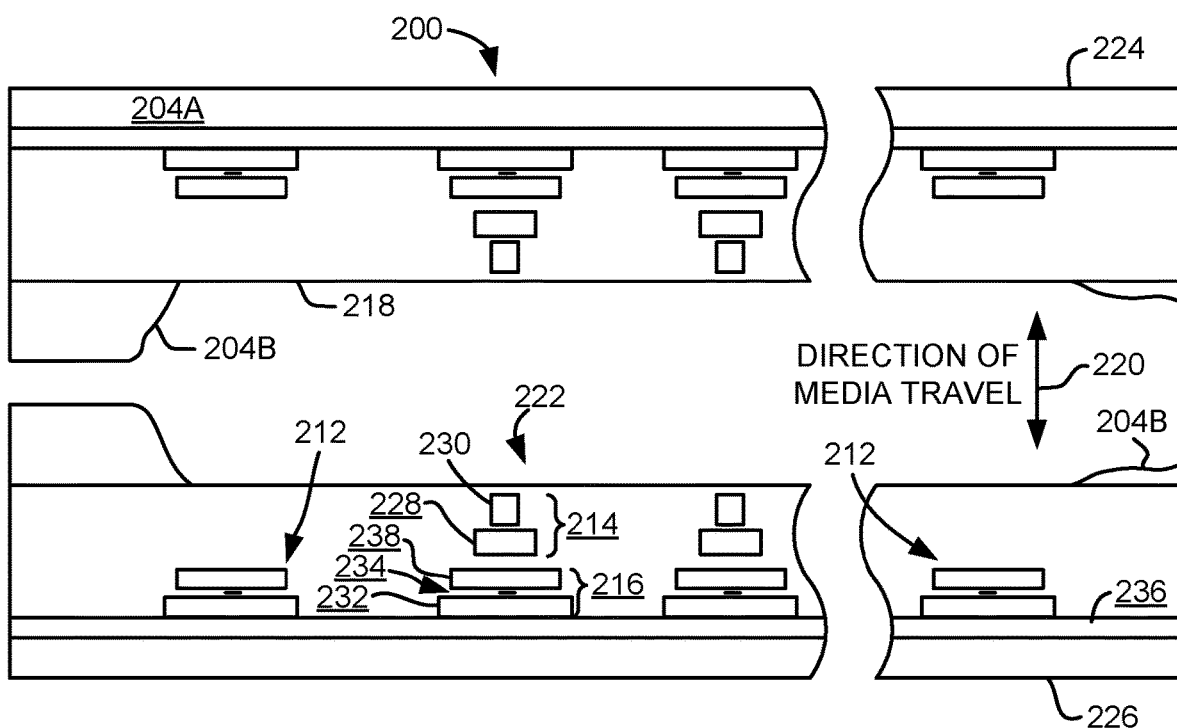
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
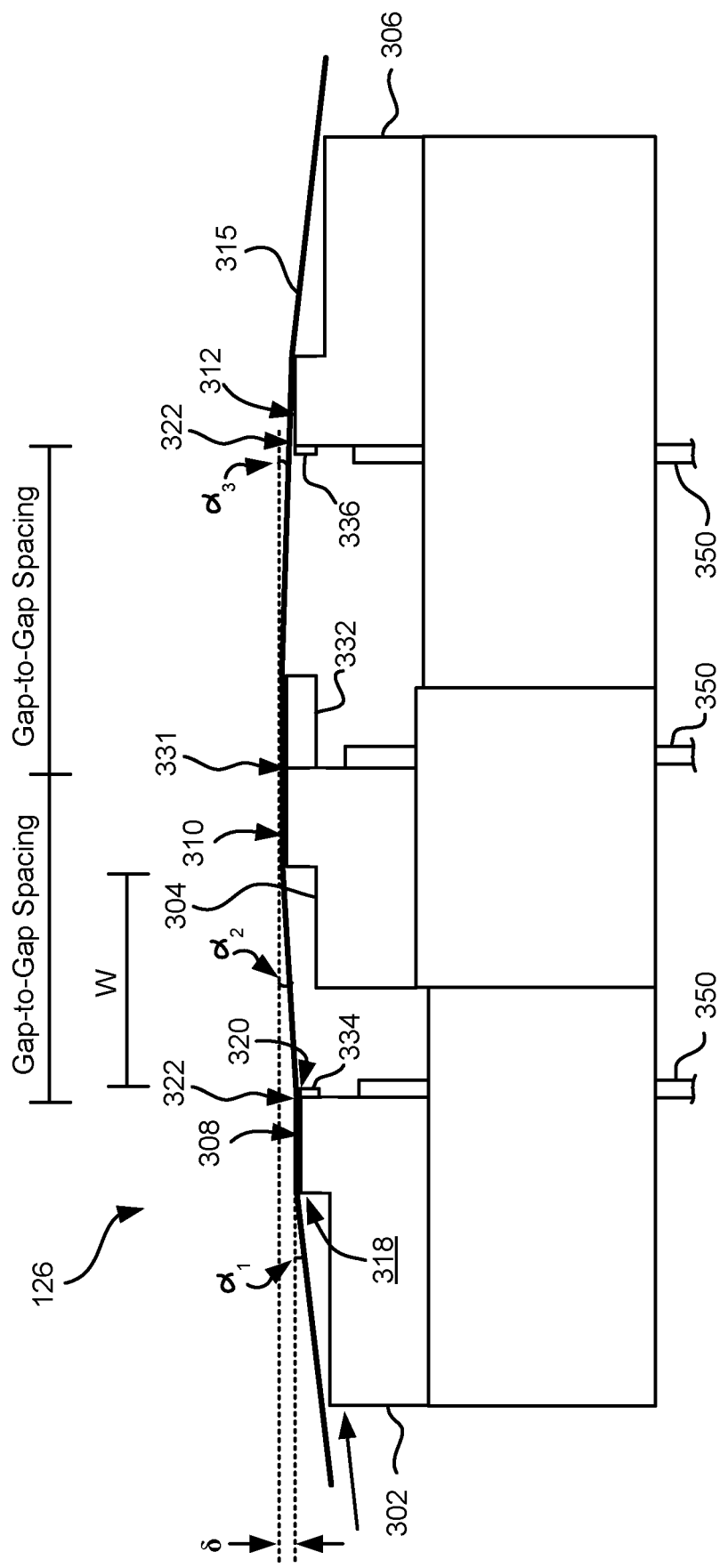
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
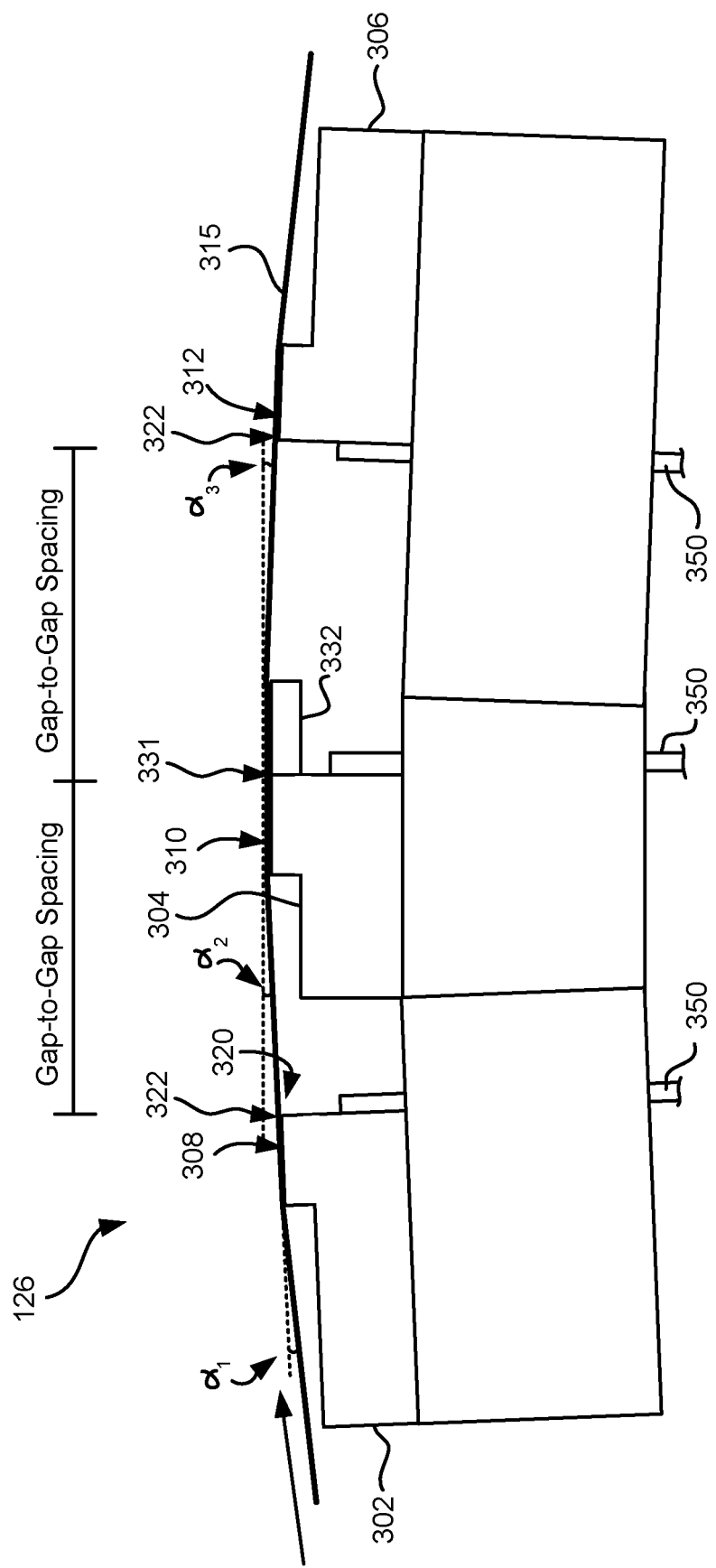
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha 3$ on the trailing edge, as the tape 315 rides above the trailing module 306. This difference is generally beneficial as a smaller $\alpha_5$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
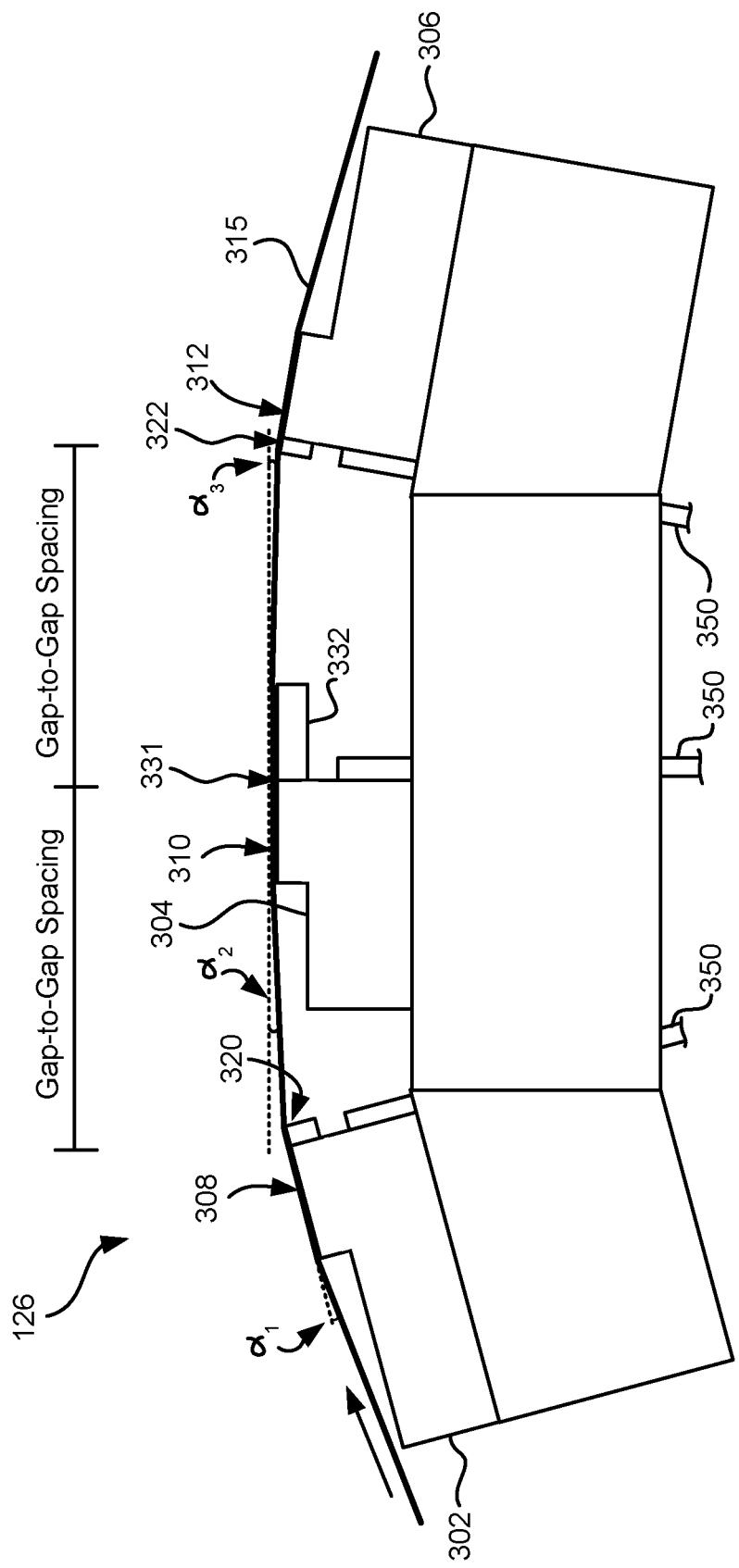
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
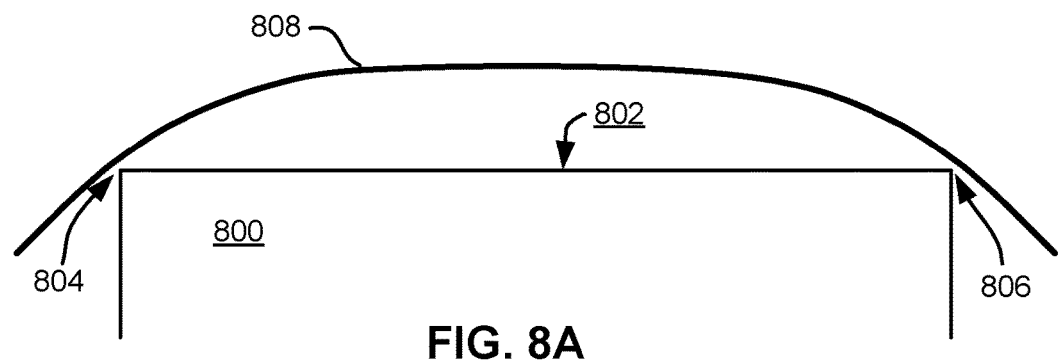
FIGS. 8A-8C are schematics depicting the principles of tape tenting.
Figure 8B:
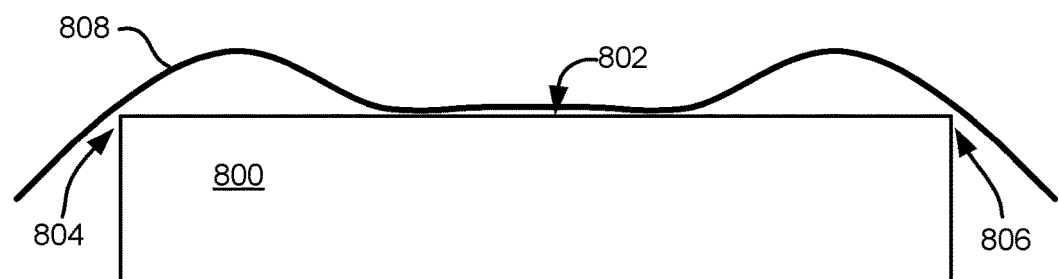
Figure 8C:
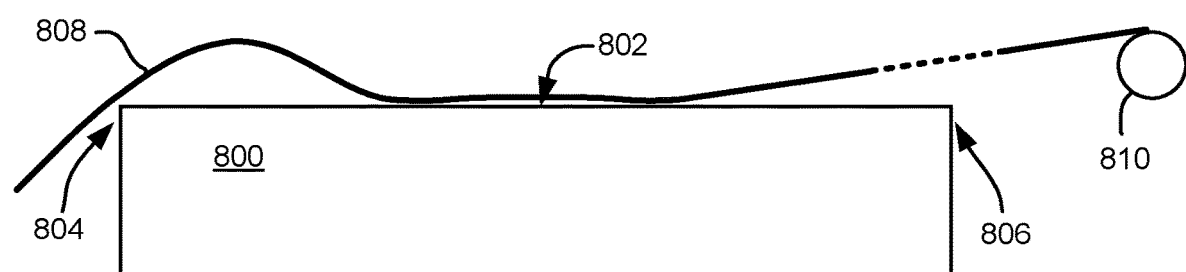

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
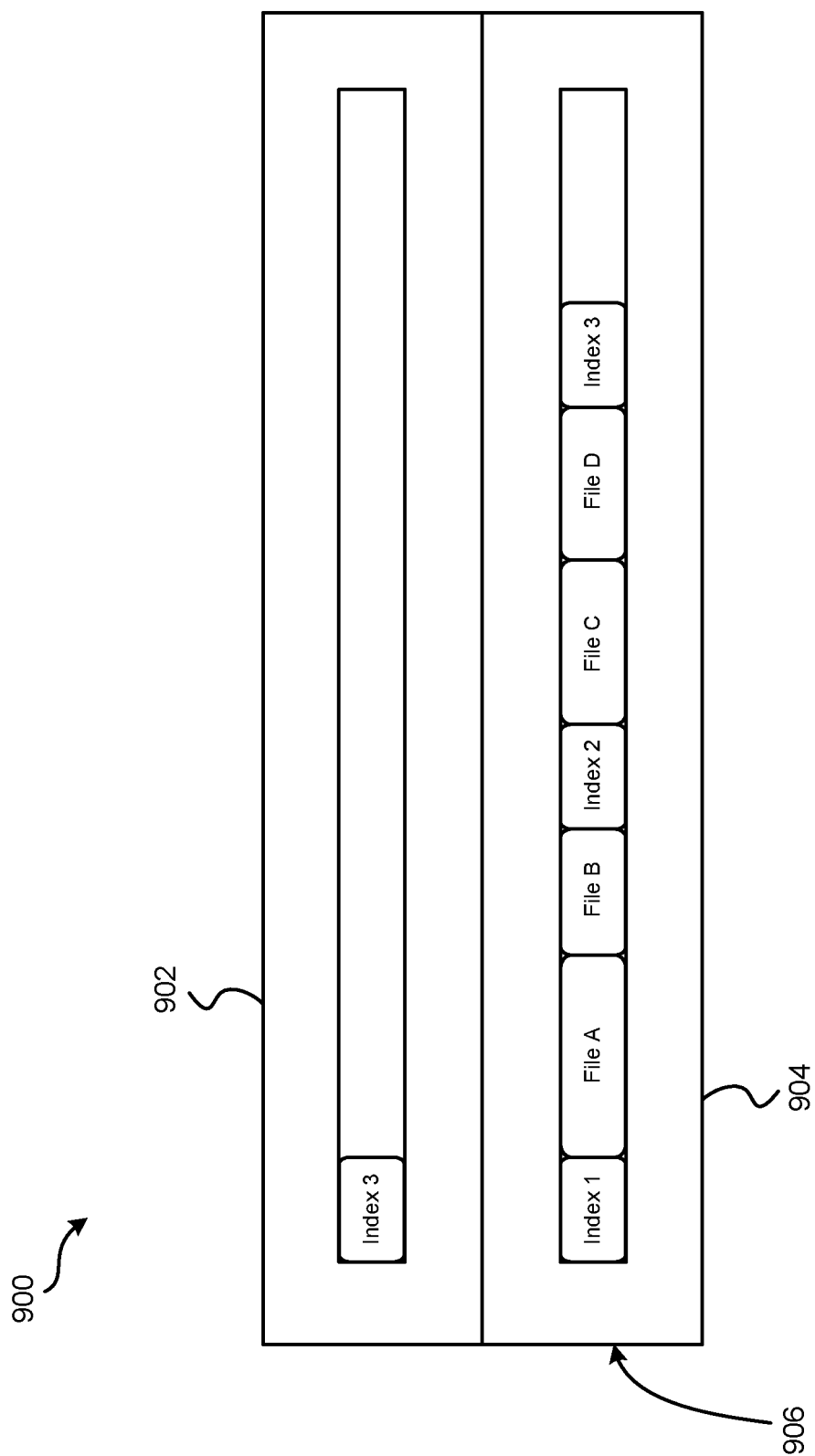
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Tape cartridge capacity in conventional tape head modules may be limited to 15 to 20 terabytes because of assembly of the modules on current U-beam technology. The modules in the form of wafer dice are typically secured to beam supports, e.g. U-beams, that provide a stable and robust base for the thin and fragile wafer dice.

Conventional U-beams tend to be sintered aluminum oxide, preferably containing other elements to make the material electrostatically dissipative. However, during the assembly process, the U-beams and the fragile dice attached to the U-beams tend to become distorted by heat cycling steps of the head build, for example, during the curing of the wire bond strain relief. Specifically, curing wire bond strain relief adhesive involves heating the cabled module assemblies to 70° C. for up to two hours. During this process, the U-beams expand and anneal, and may not return to the pre-anneal dimensions. Since the attached die tends to generally follow the motion of the U-beam, the critical span between the servo readers and the magnetic recording transducers situated therebetween on the die may change. The effect of the U-beam changes on the attached die may vary from module to module, thereby resulting in recording modules with a transducer pitch that is different for different modules. Therefore, the variability of transducer pitch between different modules may result in an inability to read a tape that was shingle-written by one drive in the same or other drives.

According to various embodiments described herein, extraneous stresses exerted upon a die in a head module beam are minimized, thereby allowing the die to retain its as-made transducer pitch. Consequently, the dice tend to not be subject to variability of transducer pitch between different modules, but rather consistency of transducer pitch from module to module is now achievable.

FIG. 10A depicts a schematic drawing of a low stress tape head module 1000, in accordance with one embodiment. As an option, the present module 1000 may be implemented in conjunction with features from any other embodiment listed herein, such as those described with reference to the other FIGS. Of course, however, such a module 1000 and others presented herein may be used in various applications and/or in permutations which may or may not be specifically described in the illustrative embodiments listed herein. Further, the module 1000 presented herein may be used in any desired environment.

Referring to FIG. 10A, the module 1000 includes a die 1002 bonded to a beam 1007.

The die 1002 includes an array of transducers 1003 positioned in a transducer region 1008 of the die 1002. The die 1002 includes a first region 1014 extending from the transducer region 1008 along a longitudinal axis of the die 1002 (parallel to direction 1005) to a first end 1004 of the die 1002 and a second region 1016 extending from the transducer region 1008 to a second end 1006 of the die 1002. According to one embodiment, the regions, for example, the first region 1014 and the second region 1016, may not overlap. The die 1002 may be of conventional construction in various approaches.

In addition, the module 1000 includes a beam 1007. In some approaches the beam may be a U-beam, e.g., of conventional construction.

In various approaches described herein, the U-beams may optionally be annealed by heat and temperature cycling prior to bonding of the die thereto, thereby allowing the U-beam to undergo a mechanical relaxation before the die attachment. Then, any annealing process applied to the module 1000 after die attachment may result in little or essentially no U-beam dimensional changes.

As shown in FIG. 10A, the first region 1014 of the die 1002 may be fixedly attached to the beam 1007. In addition, the transducer region 1008 and the second region 1016 are not fixedly attached to the beam 1007. Further, a space 1020 may be present between the beam 1007 and the regions of the die 1002 that are not fixedly attached to the beam 1007. Alternatively, in other embodiments, the second region 1016 of the die 1002 may be fixedly attached to the beam 1007 and the transducer region 1008 and the first region 1014 are not fixedly attached to the beam 1007.

By fixedly coupling only the first region 1014 of the die 1002 to the beam 1007, any stresses acting within or upon the beam 1007 are not transferred to the transducer region 1008 of the die 1002, and thus the array of transducers 1003 within the die 1002 are not notably affected by such stresses.

Any known technique, material, etc. may be used to couple the die 1002 to the beam 1007. In some embodiments, an adhesive 1012 fixedly attaches the die 1002 to the beam 1007. Illustrative adhesives include cyanoacrylate (e.g. Loctite®380), epoxy resin, two-part epoxy, etc.

The adhesive 1012 may be applied only in the target area, e.g., under the first region 1014 of the die 1002. For example, the adhesive 1012 may be applied in the target area, the die aligned to the beam, and the adhesive allowed to cure.

In preferred approaches, the adhesive 1012 is applied in the target area, and a second adhesive (not shown) is applied along the opposite portion of the die 1002 to enhance stability of the die during adhesive curing, and then removed, e.g., via solvent. The adhesive 1012 would not be significantly affected by the solvent. In one example, a solvent-resistant adhesive 1012 may fixedly attach the die to the beam under the first region 1014, while a sacrificial adhesive that dissolves in solvent is applied under the second region 1016, and later removed by application of the solvent thereto. An illustrative solvent is acetone, though any suitable known adhesives/solvent combination may be implemented.

In some approaches, a sacrificial adhesive may be applied to facilitate taperless grind, beveling, cabling, wire bonding, etc. In some approaches, the sacrificial adhesive may hold the die 1002 to the beam 1007 while the solvent-resistant adhesive 1012 sets. Further, the sacrificial adhesive may be wicked in after the module is bonded to actuator pocket (not shown), and then the sacrificial adhesive may be dissolved in acetone after cable cure.

In a further approach, the second region 1016, and optionally the transducer region 1008, may be flexibly attached to the beam, e.g., by a flexible adhesive. Such flexible adhesive may remain in the module, i.e., is not removed, for such purposes as to allow it to dampen any resonance that may occur during use in what would otherwise be the cantilevered region of the die. Any known type of flexible adhesive may be used. For example, a flexibilized epoxy may be used.

Note that as used herein, flexibly attached is not the same as fixedly attached. The flexible attachment should give enough to relieve any significant amount of stress that would otherwise by exerted on the die due to expansion or contraction of the beam.

In some approaches, the module 1000 may include a notch 1010 in the beam 1007, where the notch 1010 may be positioned on a die-facing side 1009 of the beam 1007 and between a first end 1004 and a second end 1006 of the beam 1007. In some approaches, the notch may be a channel, recessed portion, etc. The notch 1010 may act as an adhesive overflow reservoir for preventing excess adhesive from flowing under and beyond the transducer region 1008 of the die 1002.

In preferred approaches, the notch 1010 may be positioned under the array of transducers 1003. In some approaches, the notch 1010 may be positioned under about the transducer region 1008 of the die 1002. In further approaches, the notch may extend along the beam 1007 beyond the extent of the transducer region 1008, toward the end of beam coupled to the die.

In some approaches, a width $w_n$ of the notch 1010 parallel to the longitudinal axis of the die may be at least a width of the array of transducers 1003 along the longitudinal axis of the die 1002 as measured between the outermost transducers. In other approaches, the width $w_n$ of the notch 1010 is less than the width of the array of transducers 1003. As shown in FIG. 10A, the end of the notch 1010 closest to the adhesive 1012 is preferably under the first region 1014 to prevent adhesive from coupling the transducer region 1008 directly to the beam 1007.

As depicted in FIG. 10B, in some approaches, the module 1000 may include a ledge 1017 behind the die 1002 for stabilizing the cantilevered portion of the die during wire bonding to the cable. Further, the side view of the module 1000 in FIG. 10B shows the space 1020 between the die 1002 and the beam 1007, with the adhesive 1012 shown behind the space 1020.

Note that, in various embodiment, provision is made to preserve the stress free state of the un-fixed portion of the die during subsequent processing steps. For example, adhesive may be applied to the wire bonds, which could wick into the open area under the un-fixed portion of the die. Accordingly, conventional processing techniques may be modified to prevent such wicking. Similarly, provision should be made to ensure similar wicking does not occur when using an adhesive to couple modules together. Such provisioning could include cutting slots into the beam, applying a sacrificial material to the un-fixed portion of the die and later removing the same, etc.

Figure 10C:
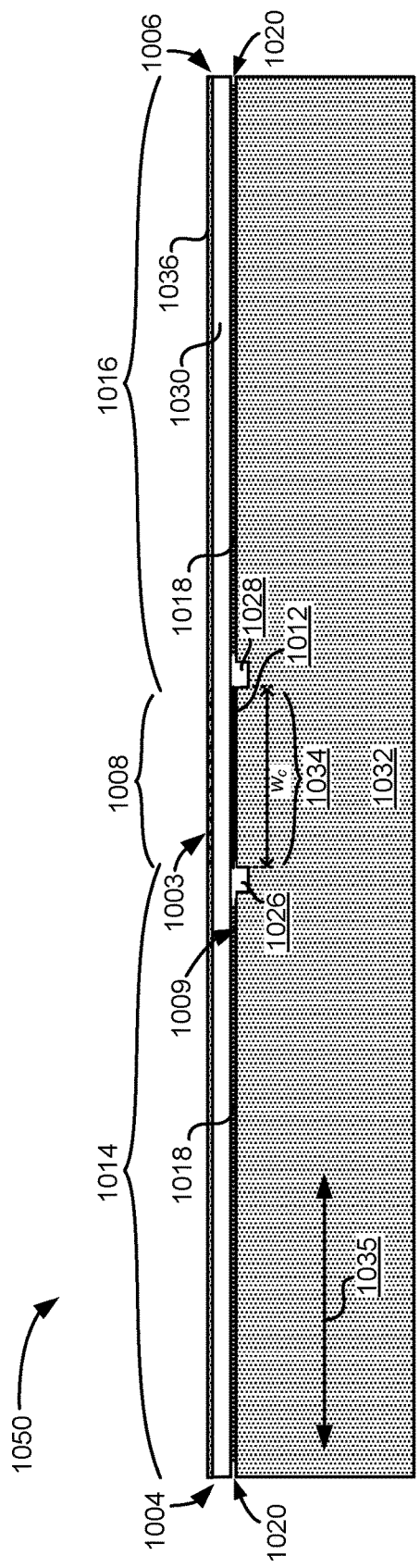
FIG. 10C is a side view of a schematic diagram of a portion of a module, according to one embodiment.

FIG. 10C depicts a schematic drawing of a low stress tape head module 1050, in accordance with one embodiment. As an option, the present module 1050 may be implemented in conjunction with features from any other embodiment listed herein, such as those described with reference to the other FIGS. Of course, however, such a module 1050 and others presented herein may be used in various applications and/or in permutations which may or may not be specifically described in the illustrative embodiments listed herein. Further, the module 1050 presented herein may be used in any desired environment.

Referring to FIG. 10C, the module 1050 includes a die 1030 bonded to a beam 1032.

The die 1030 includes an array of transducers 1003 in a transducer region 1008 of the die 1030, a first region 1014 extending from the transducer region 1008 along a longitudinal axis of the beam 1032 to a first end 1004 the die 1030 and a second region 1016 extending from the transducer region 1008 to a second end 1006 of the die 1030. According to one embodiment, the regions, for example, the first region 1014 and the second region 1016, may not overlap. The die 1030 may be of conventional construction in various approaches.

In addition, the module 1050 includes a beam 1032. In some approaches the beam may be a U-beam, e.g., of conventional construction.

In various approaches described herein, the U-beams may optionally be annealed by heat and temperature cycling prior to bonding of the die thereto, thereby allowing the U-beam to undergo a mechanical relaxation before the die attachment. Then, any annealing process applied to the module 1050 after die attachment may result in little or essentially no U-beam dimensional changes.

Figure 10D:
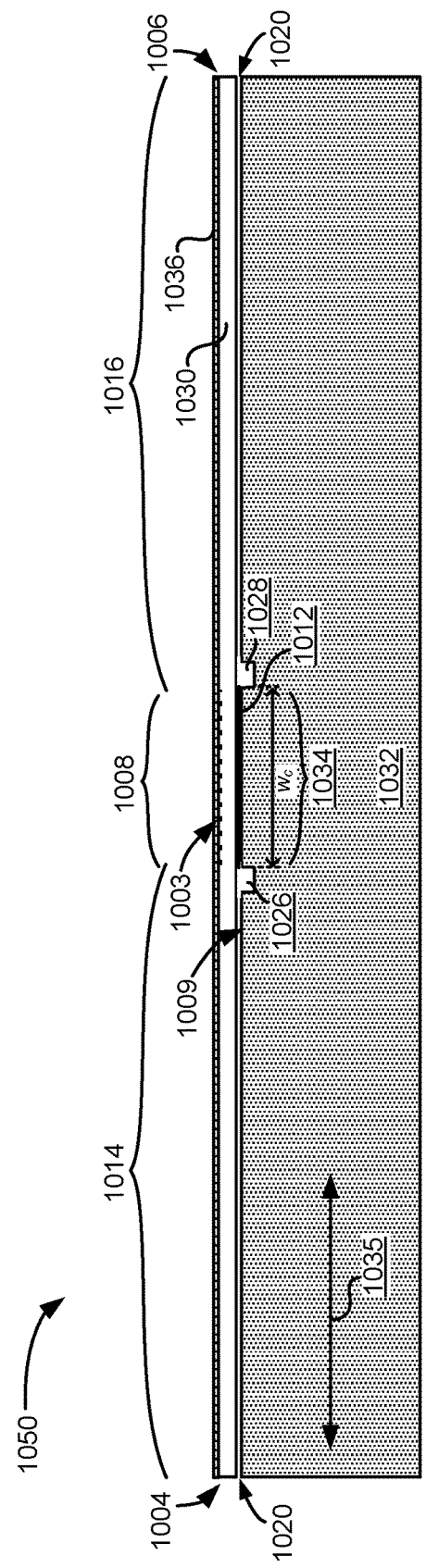
FIG. 10D is a side view of the module of FIG. 10C after removal of sacrificial adhesive, according to one embodiment.

As shown in FIGS. 10C-10D, the transducer region 1008 of the die 1030 may be fixedly attached to the beam 1032. In addition, the first region 1014 and the second region 1016 may not be fixedly attached to the beam 1032, as shown in FIG. 10D. Further, spaces 1020 may be present between the beam 1032 and the regions 1014, 1016 of the die 1030 that are not fixedly attached to the beam 1032.

By coupling only the transducer region 1008 of the die 1030 to the beam 1032, any stresses acting within or upon the beam 1032 are only minimally transferred to the transducer region 1008 of the die 1030 at the localized area of bonding, and thus the array of transducers 1003 within the die 1030 are not notably affected by such stresses.

Any known technique, material, etc. may be used to couple the die 1030 to the beam 1032. In some embodiments, an adhesive 1012 fixedly attaches the die 1030 to the beam 1032. Illustrative adhesives include cyanoacrylate (e.g. Loctite®380), epoxy resin, two-part epoxy, etc.

The adhesive 1012 may be applied only in the target area, e.g., under the transducer region 1008 of the die 1030. For example, to form the module 1050, the adhesive 1012 may be applied in the target area, the die aligned to the beam, and the adhesive allowed to cure.

In preferred approaches, the adhesive 1012 is applied in the target area, and a second, sacrificial adhesive 1018 is applied along the regions 1014, 1016 of the die 1030 to enhance stability of the die during adhesive curing and possibly other processing steps. See FIG. 10C. The sacrificial adhesive 1018 is later removed via conventional techniques. In one example, a solvent-resistant adhesive 1012 may fixedly attach the die to the beam under the transducer region 1008, while a sacrificial adhesive 1018 that dissolves in solvent is applied under the first and/or second region 1014, 1016, and later removed by application of the solvent thereto. An illustrative solvent is acetone, though any suitable known adhesives/solvent combination may be implemented. An example of an acetone-sensitive adhesive is cyanoacrylate (e.g. Loctite®380).

In some approaches, a sacrificial adhesive may be applied to facilitate taperless grind, beveling, cabling, wire bonding, etc. In some approaches, the sacrificial adhesive 1018 may hold the die 1030 to the beam 1032 while the solvent-resistant adhesive 1012 sets. Further, the sacrificial adhesive may be wicked in after the module is bonded to actuator pocket (not shown), and then the sacrificial adhesive may be dissolved in acetone after cable cure.

In a further approach, the first region 1014 and/or the second region 1016 may be flexibly attached to the beam 1032, e.g., by a flexible adhesive. Such flexible adhesive may remain in the module, i.e., is not removed, for such purposes as to dampen any resonance that may occur during use. Any known type of flexible adhesive may be used.

When the module 1050 is ready for use, the first region 1014 and the second region 1016 of the die 1030 are not fixedly attached the beam 1032, as shown in FIG. 10D.

In some approaches, the module 1050 may include at least one channel 1026 in the beam 1032, where the at least one channel 1026 may be positioned on a die-facing side 1009 of the beam 1032 and positioned adjacent to the center portion 1034 of the beam 1032, such that the center portion 1034 of the beam 1032 is fixedly attached to the transducer region 1008 of the die 1030. In some approaches, the channel may be a notch, recessed portion, etc. In other approaches, the module 1050 may include two channels 1026, 1028 in the beam, wherein each channel 1026, 1028 may be positioned on either side of the center portion 1034 of the beam 1032 and on the die-facing side 1009 of the beam 1032. Furthermore, the transducer region 1008 of the die 1030 is fixedly attached to the center portion 1034 of the beam 1032 with a channel 1026, 1028 on either side of the center portion 1034.

The at least one channel 1026 may act as an adhesive overflow reservoir for preventing excess adhesive from flowing under and beyond the regions 1014, 1016 of the die 1030. In some approaches, the channels 1026, 1028 may create a "glue island" on center portion 1034 of the beam 1032 beneath the transducer region 1008 of the die 1030.

In preferred approaches, a center portion 1034 of the beam 1032 may be positioned under the array of transducers 1003. In some approaches, the center portion 1034 may be positioned under about the transducer region 1008 of the die 1030. In further approaches, the center portion 1034 may extend along the beam 1032 beyond the extent of the transducer region 1008, toward one or both ends of the beam.

In some approaches, a width $w_c$ of the center portion 1034 along the longitudinal axis 1035 of the beam 1032 may be at least the width of the array of transducers 1003 parallel to the longitudinal axis 1035 of the beam 1032 as measured between the outermost transducers. In other approaches, the width $w_c$ of the center portion is less than the width of the array of transducers 1003.

In approaches using LTO heads, the width $w_c$ of the center portion 1034 of the beam 1032 is approximately 3 mm or less.

In some approaches, the die 1030 may have a protecting coating 1036 of conventional type thereon.

In other embodiments, the material of the U-beam may be modified to minimize susceptibility to head assembly conditions. In some approaches, the material of U-beam assembly may be modified to minimize susceptibility to head mechanical cycling.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    attaching a die to a beam, wherein the die comprises an array of transducers positioned in a transducer region of the die, a first region extending from the transducer region to a first end of the die and a second region extending from the transducer region to a second end of the die,
    wherein the first region of the die is attached to the beam, wherein the transducer region and the second region are not attached to the beam.

2. A method as recited in claim 1, comprising before attaching the die to the beam, applying thermal annealing treatment to the beam.

3. A method as recited in claim 1, wherein the beam is a U-beam.

4. A method as recited in claim 1, wherein the die is fixedly attached to the beam, wherein an adhesive fixedly attaches the die to the beam.

5. A method as recited in claim 4, wherein the adhesive is selected from the group consisting of: cyanoacrylate, epoxy resin, and two-part epoxy.

6. A method as recited in claim 4, wherein the adhesive is solvent-resistant.

7. A method as recited in claim 4, wherein fixedly attaching the die to the beam comprises:
applying the adhesive to a target area under the first region of the die;
aligning the die to the beam;
attaching the die to the beam wherein the adhesive is between the die and the beam; and
curing the adhesive therebetween.

8. A method as recited in claim 1, wherein the second region of the die is flexibly attached to the beam.

9. A method as recited in claim 8, wherein a second adhesive flexibly attaches the second region to the beam.

10. A method as recited in claim 9, wherein the second adhesive is a flexible adhesive.

11. A method as recited in claim 9, wherein the second adhesive is a sacrificial adhesive.

12. A method as recited in claim 11, comprising, the second adhesive is removed after curing the adhesive between the die and the beam.

13. A method as recited in claim 1, comprising,
before attaching the die to the beam,
forming a notch in the beam, wherein the notch is positioned on a die-facing side of the beam and between a first end and a second end of the beam.

14. A method as recited in claim 13, wherein the notch is a channel.

15. A method as recited in claim 13, wherein the notch is an adhesive overflow reservoir.

16. A method as recited in claim 13, wherein the notch is positioned under the array of transducers.

17. A method as recited in claim 13, wherein a width of the notch is at least a width of the array of transducers of the die.

18. A method as recited in claim 13, wherein the notch of the beam is positioned at about the transducer region of the die.

19. A method for removing a sacrificial adhesive from an apparatus, the method comprising:
applying a solvent to an apparatus having a die fixedly attached to a beam, wherein a solvent-resistant adhesive attaches a first portion of the die to the beam and a sacrificial adhesive attaches a second portion of the die to the beam, wherein the solvent dissolves the sacrificial adhesive thereby removing the sacrificial adhesive from the apparatus.

* * * * *